United States Patent [19]

Bukovich et al.

[11] 3,726,519

[45] Apr. 10, 1973

[54] RHD-CARD TRANSPORTATION AND POSITIONING

[75] Inventors: George D. Bukovich, Minneapolis; Leroy A. Vos, Saint Paul; Gary B. Woehler, Minneapolis, all of Minn.

[73] Assignee: Sperry Rand Corporation, New York, N.Y.

[22] Filed: Feb. 11, 1971

[21] Appl. No.: 114,458

[52] U.S. Cl. ......................271/3, 209/80.5, 271/74, 340/174.1 C, 340/174.1 E

[51] Int. Cl. ..........................B65h 5/22, B65h 29/24

[58] Field of Search..................................209/80.5; 271/DIG. 2, 74, 3, 71, 80, 51; 340/174.1 C, 174.1 E, 174.1 F

[56] References Cited

UNITED STATES PATENTS

| | | | |
|---|---|---|---|
| 3,287,010 | 11/1966 | Stone et al. | 271/74 X |
| 3,371,929 | 3/1968 | Shebanow | 271/74 |
| 1,669,552 | 5/1928 | Brunk | 271/DIG. 2 |
| 2,791,424 | 5/1957 | Noon | 271/DIG. 2 |
| 3,420,521 | 1/1969 | Shebanous | 271/3 X |

*Primary Examiner*—Evon C. Blunk
*Assistant Examiner*—Bruce H. Stoner, Jr.
*Attorney*—Thomas J. Nikolai and John P. Dority

[57] ABSTRACT

A rotating drum contains a plurality of read/write heads rotating therewith. A cartridge, having first and second sections, is positioned in a fixed position relative to said drum and has a plurality of cards retained in said first section with means for selectively releasing any card. A first chute is positioned to transport any card from the cartridge to a predetermined and non-rotating position around said drum, where the read/write function occurs. A second chute is positioned to transport a card from its predetermined position around the drum back to the second section of the cartridge, which section is maintained free of cards except for the returning card. Means are provided for maintaining an air bearing between the card and the drum during transport of the card, as well as when the card is in its predetermined position around the drum periphery.

7 Claims, 6 Drawing Figures

INVENTOR
GEORGE D. BUKOVICH
LEROY A. VOS
GARY B. WOEHLER
BY Donald W. Phillion
ATTORNEY INVENTORS
GEORGE D. BUKOVICH
LEROY A. VOS
GARY B. WOEHLER
BY Donald W. Phillion
ATTORNEY

RHD-CARD TRANSPORTATION AND POSITIONING

This invention relates generally to random access files of the type employing a rotating drum, and more particularly to a random access file employing a rotating magnetic head drum and a plurality of magnetic cards which can be positioned individually, and selectively, in a non-rotating manner, around the drum for reading or writing purposes.

BACKGROUND OF THE INVENTION

There are many types of mass storage devices employing rotating magnetic drums. One of the earliest of such devices consisted of a drum coated with a magnetic material and which rotated past an array of fixed read/write heads. Such a device provided fast access to the surface of the drum but was of somewhat limited capacity due to the limited surface of the drum.

Later devices introduced the concept of a rotating drum with the reading and writing heads contained within and rotating with the drum. The magnetic recording surfaces are provided by a plurality of flexible cards coated with a magnetic material and retained in a cartridge, or card holder. Such cards can be selectively extracted from the cartridge and caused to assume a given predetermined circumferential position around the drum, which position does not rotate with the drum.

In the last-mentioned prior art device the cartridge is physically moved back and forth so as to position a selected card over a narrow slot, or chute, which functions to transport the card from the cartridge to its fixed circumferential position around the drum.

Each of the cards is sufficiently long so that after it has been transported to its predetermined position, a portion thereof will remain in the cartridge between the two adjacent cards from which it was selected. When reading or writing is completed, appropriate means are provided to move the card back into the cartridge, where retaining means are provided to receive and retain the returning card for the next selection thereof. The returning card will always move back into the cartridge between the same two adjacent cards from which it was extracted.

A difficulty with the aforementioned structure is the requirement for considerable electronic and electromechanical structure necessary to first determine which card is being selected, and then to physically move the cartridge to the proper position before the card can be released for transportation to the drum. The time interval required to move the cartridge in preparation for release of the card places obvious and serious limitations on the access time of the memory file.

SUMMARY OF THE INVENTION

It is a primary object of the invention to provide a random access memory file of the type described above wherein a given card can be selected and transported from its retaining cartridge to its fixed circumferential position around the rotating drum in a shorter time interval than heretofore attainable.

A second object of the invention is a random access file of the type described in which any card can be selected and transported from its retaining cartridge to a fixed circumferential position around the rotating drum, and subsequently back into the cartridge without ever moving the cartridge.

A third aim of the invention is a random access file of the type described employing a first chute for transporting a selected card from a cartridge to a rotating magnetic drum without moving said cartridge, and a second chute for returning said card to said cartridge, also without moving said cartridge, to thereby provide faster and more reliable access to said cards.

A fourth purpose of the invention is an inexpensive and reliable random access file of the type described, and having a fast access time.

A fifth aim of the invention is a random access file of the type described and having a faster access time than heretofore attainable.

A sixth purpose of the invention is the improvement, generally, of random access files of the type described.

In accordance with the invention there is provided a read/write station comprising a constantly rotating magnetic head drum. Positioned near the drum is a card-holding cartridge divided into first and second portions and containing a plurality of flexible, elongated magnetic cards, each of which has a first and a second end and each of which is suspended from said second end within said cartridge.

Transporting means is provided for transporting a selected one of said cards, first end first, from said card holder (cartridge) to a fixed predetermined circumferential position around said drum for reading and writing purposes, and subsequently for transporting the selected card back to the cartridge. The said transportation means comprises a first and a second chute, with the card being transported from the first portion of the cartridge to its predetermined circumferential position through the first chute and then back to the second portion of the card holder through the second chute. The cartridge is so constructed that said second portion thereof remains free of cards, other than the card being returned thereto from the predetermined circumferential position around said drum. More specifically, as soon as a returning card is received in said second portion of the card holder, it is moved into said first portion thereof so that such card is again ready to be selected for reading or writing purposes and the second portion of the cartridge is ready to receive another returning card.

In accordance with a feature of the invention a first air pressure reducing means is provided to reduce the air pressure around the periphery of the drum beginning at a point immediately preceding the point where the card leaves said first chute and begins to wrap around the drum, thereby creating a partial vacuum between the surface of the drum and the card being received to cause said card to fit snugly around the drum periphery.

A rotating capstan is positioned outside said second chute opposite the second end of the card when said card is in said predetermined circumferential position. A portion of said capstan extends into said second chute through an opening provided in the wall thereof. Further, a second air pressure reducing means is provided to cause an air flow from within said second chute, out through the opening therein and toward said capstan, thus tending to draw the second end of said card into contact with said rotating capstan. Upon completion of reading or writing of the card the first air pressure reducing means is de-energized thereby permitting the second end of said card to be lifted from said drum and into contact with said rotating capstan which then functions to move said card along said second chute and into the second portion of said cartridge, where suspension type retaining means are provided to receive and retain the returning card.

In accordance with another feature of the invention means are provided for directing a jet of air toward the peripheral surface of the drum at the point where the card being transported leaves said first chute and begins to wrap around the drum, thereby providing an air bearing for the card as it leaves the said first chute. The amount of air introduced between the card and the rotating drum by said air jet is less than the amount of air removed from the surface of the drum by said air pressure reducing means, with an overall effect of a reduced air pressure between the periphery of the drum and the card being wrapped therearound. A thin film of air, however, does exist between the card and the drum in order to provide a fluidic (air) bearing which permits the drum to rotate under the card, after said card assumes its fixed, non-rotating circumferential position.

BRIEF DESCRIPTION OF DRAWINGS

The above-mentioned and other objects and features of the invention will be more fully understood from the following detailed description thereof when read in conjunction with the drawings in which.

DETAILED DESCRIPTION

Figure 1:
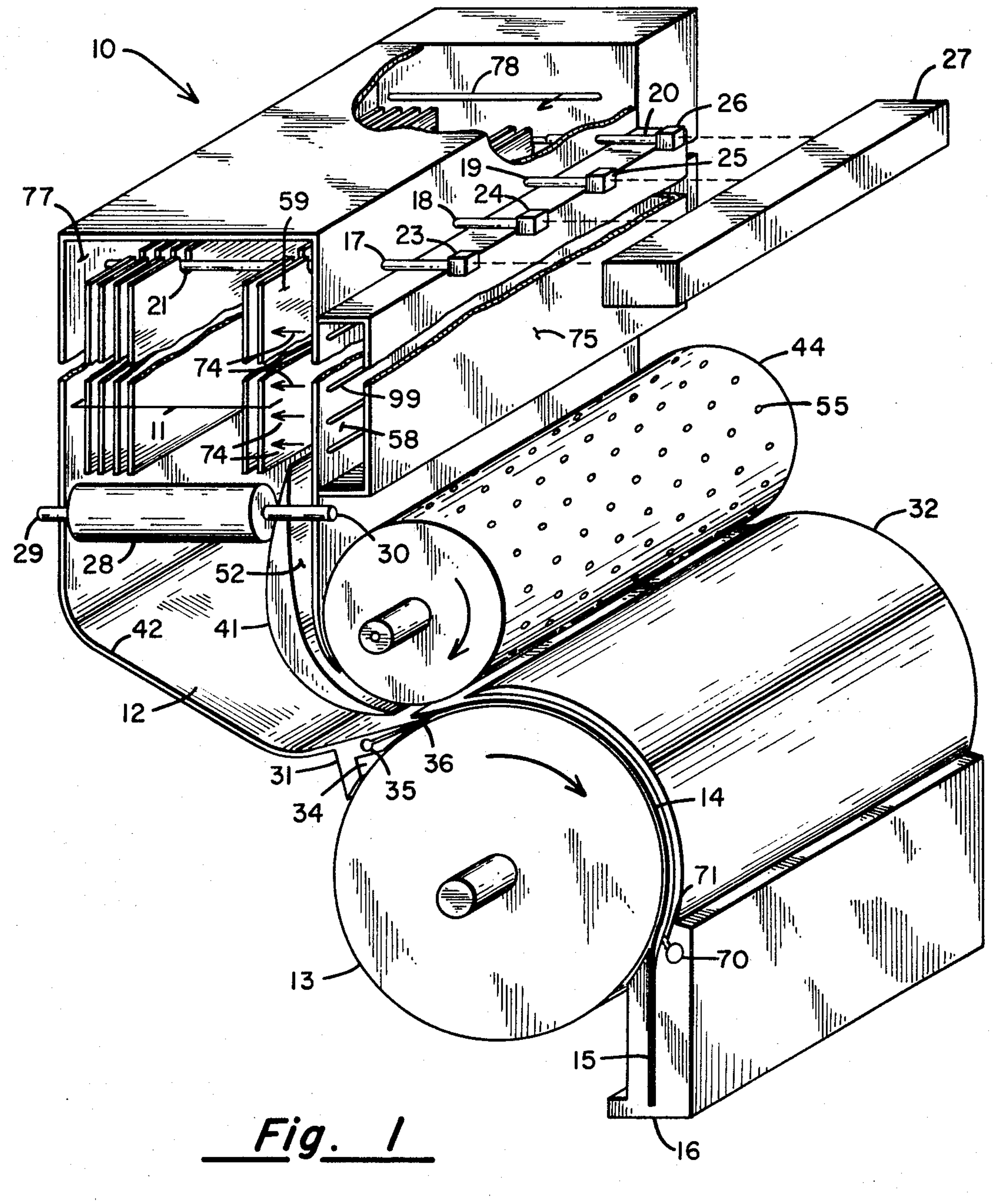
FIG. 1 is a perspective view of one form of the invention.

Referring now to FIG. 1 there is shown a cartridge 10 which holds a plurality of flexible magnetic cards 11 by a suspension means which includes the rods 17, 18, 19 and 20. A first chute means 12 bounded by walls 41 and 42 functions to transport selected ones of said cards 11 as they are individually released from their suspension means to be transported to a fixed, predetermined position around the rotating head drum 13. Such predetermined fixed position is represented by the position of card 14, which is shown wrapped around a portion of the rotation head drum 13, with the leading end thereof resting in the bottom of a slot 15, which is part of a braking means 16.

The means for selecting and dropping a given card into chute 12 comprises the rods 17, 18, 19 and 20 which extend through the wall of cartridge 10 and then through coded slots in the top ends of cards 11. More specifically, each of the cards 11 is provided with a series of coded slots, such as slot 21, at the upper end thereof. The shape of the slots 21 and the shape of the cross-sectional areas of the rods 17–20 are such that the cards 22 will remain suspended on the rods 17–20 when said rods are all in a given position. Then, by rotating certain selected ones of the rods 17–20 a selected card will fall into the chute 12 to be transported to the predetermined fixed position around the drum 13. The rods 17–20 are provided with terminating ends 23–26 respectively, having cross-sectional areas of a suitable shape, rectangular for example, which can be actuated to rotate rods 17–20 by suitable actuating means 27.

For a more detailed description of a specific structure for suspending the cards 11 by coded rods which can be actuated to release any given selected card, reference is hereby made to U.S. application, Ser. No. 828,858, now U.S. Pat. No. 3,669,262, filed May 29, 1969 by L. E. Gerlach, et al., entitled REMOVABLE CARD-HANDLING CARTRIDGE, assigned to the Sperry Rand Corporation, the common assignee of the present application, and incorporated herein by reference.

Once released from cartridge 10 a card is accelerated by continuously rotating rollers such as roller 28, which has end shafts 29 and 30 mounted in suitable bearings fixed with respect to the cartridge 10. The rollers, such as roller 28, are positioned at both ends of the cartridge 10 and spaced apart a distance such that the edges of the released card will be gripped therebetween and accelerated down into the chute 12, and around the drum 13 into the predetermined fixed position represented by the position of card 14.

In order to maintain the necessary close spacing between the magnetized surface of card 14 and the rotating drum 13, containing the reading and writing heads there is provided a shoe 31 which is positioned adjacent the periphery of drum 13 and which extends axially along the length thereof. Within this shoe 31 there are two chambers 34 and 35. The chamber 34 has a reduced air pressure therein with respect to the ambient air pressure and the chamber 35 has a positive air pressure therein with respect to the ambient air pressure. Consider first the reduced air chamber 34 which functions to strip the periphery of the drum of a substantial portion of the air molecules as the drum rotates by. Thus, when the card 14 leaves the chute 12 and begins to wrap around the drum 13, under the protection of concentric plate 32 the reduced air pressure on the peripheral surface of the drum results in a close spacing between the card and the drum surface. Enough air, however, must remain between the card and the drum surface to provide an air bearing so that the drum can rotate while the card remains stationary in the position represented by card 14. As discussed below the positive air pressure chamber 35 replaces some, but not all, of the air removed by the reduced air pressure chamber 34, as well as performing its principal function, set forth immediately below.

In order to prevent the magnetized surface of the card from scraping against the edge of chute 12 as its leaves said chute and wraps around drum 13, the positive air pressure within said second chamber 35 functions to emit a narrow, laminar jet of air out of the slot 36, which slot terminates at the edge of the exit of chute 12 and extends along the entire axial length of drum 13.

This jet of air provides an air bearing for the card as it leaves the chute and also replaces some of the air removed by vacuum chamber 34. However, the amount of air introduced between the card surface and the drum by the jet from slot 36 is less than the amount of air removed by vacuum chamber 34. The overall result is that the air pressure between the drum surface and the card 14 is less than the ambient air pressure existing on the outside of card 14.

Figure 2:
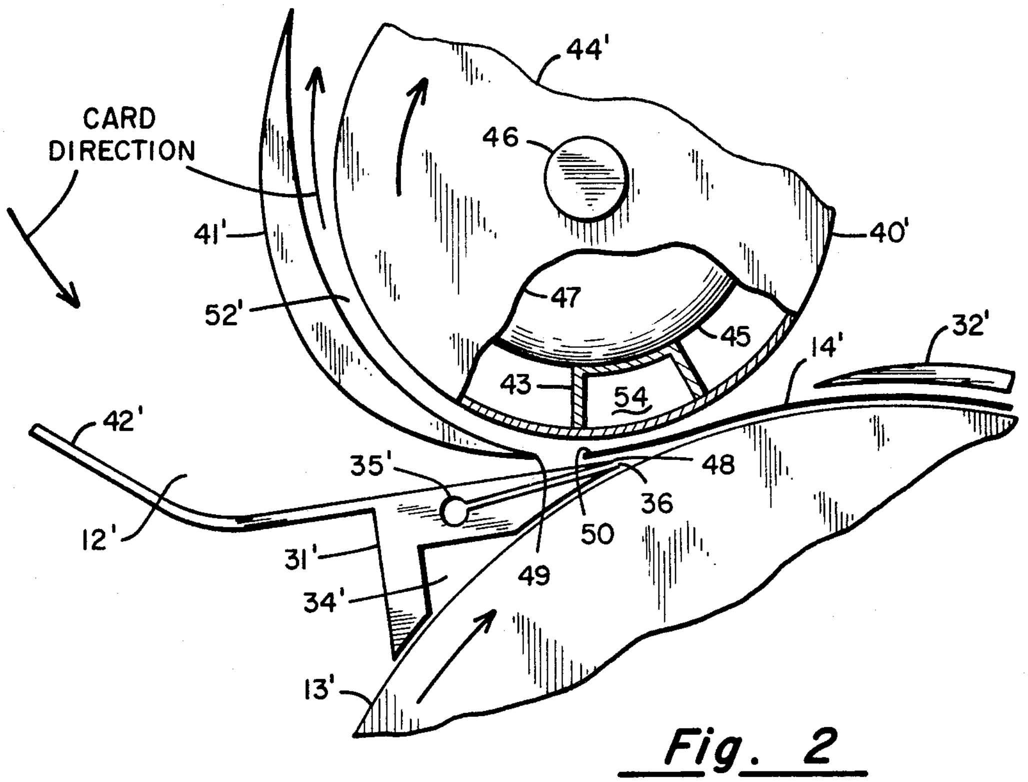
FIG. 2 is a detailed illustration of the junction of the exit of said first chute, the entrance to said second chute, and the periphery of the rotating drum.

Reference is now made to FIG. 2 which shows an expanded view of the junction of the exit of chute 12′ with the periphery of the rotating drum 13′. Those elements of FIG. 2 which have corresponding elements in FIG. 1 are identified by the same reference characters, although primed.

In FIG. 2 the card 14′ is assumed to have been transported down the chute 12′ from the cartridge (not shown in FIG. 2) and finally positioned in its predetermined circumferential position around the drum 13′. It will be seen that the trailing end 50 of the card 14′ has not passed beyond the lip 48 of the end of chute 12′. Thus, in the read/write position of card 14′ the jet of air from slot 36′ will be directed just under the end 50 of the card 14′. Such jet of air operates, as discussed above, in conjunction with the partial vacuum created in vacuum chamber 34′ to maintain a desired, reduced air pressure between the surface of the drum 13′ and the card 14′.

Furthermore, the jet of air supplied from slot 36′ functions to move the card 14′ towards the periphery of drum 13′ in accordance with Bernoulie's principle. However, card 14′ does not actually come into contact with the surface of drum 13′ due to the rapidly rising increase in air pressure as the card surface moves increasingly closer to the periphery of drum 13′.

At the end of the read/write function, the card 14′ is ordinarily returned to the cartridge. Such return of the card occurs through chute 52′. However, in order to transport the card through the chute 52′ it is first necessary to move the card 14′ into contact with the clockwise rotating capstan 44′, whose peripheral surface 40 is of a material which makes a good friction contact with the card 14′.

To cause the card 14′ to move into contact with the capstan 44′ the following functions are caused to occur. Firstly, it is to be noted that a reduced air pressure exists at all times within the chamber 54 formed by the channel 43 which is positioned within the rotating capstan 44′. The channel 43 does not rotate with the capstan 44′ but rather is secured to the non-rotating casing of a motor 45. The shaft 46 of motor 45 is coupled to the rotating capstan 44′ through a bell shaped coupling means 47.

During the existence of the partial vacuum created in the chamber 34′ of shoe 31′, and the existence of the air jet from slot 36′, the air pressures on the card 14′ are such as to maintain said card 14′ in the position shown in FIG. 2, i.e., in close proximity to the periphery of the rotating drum 13′ and completely out of contact with the rotating capstan 44′.

However, when the vacuum within the chamber 34′ is released and the air jet from slot 36′ is terminated, the end 50 of card 14′ will be drawn up against the rotating capstan 44′ due to the partial vacuum existing in chamber 54.

It should be noted that the rotating capstan 44′ has a plurality of rows of holes such as the holes 55 in FIG. 1. These rows of holes, which are positioned at an angle with respect to the axis of rotation of the capstan 44 to reduce noise, permit air to flow therethrough and into the partial vacuum in chamber 54 (FIG. 2) as said rows of holes pass said chamber. Such flow of air into chamber 54 functions to pull the card 14′ into contact with the rotating capstan 44′. The card is then very quickly thrown up through chute 52′ and into cartridge 10 (FIG. 1).

Returning again to FIG. 1, the cartridge 10 is divided into two sections, although no physical divider is present. More specifically the two sections of cartridge 10 are defined as the section thereof which is above the first chute 12 and the section thereof which is above the second chute 52. All of the cards available for selecting are suspended above chute 12 so that when they are released from suspension they will drop into the chute 12 and be transported into said predetermined position around the drum 13. The section of the cartridge 10 above the chute 52 is always maintained free of cards except for that card being returned thereto through chute 52.

The means for maintaining the said second section of the cartridge, above chute 52, clear of cards comprises a chamber 58 formed within a channel 75, and within which channel a positive air pressure is maintained. Such positive air pressure forces streams of air 74 out of the slots 99 against the sides of the end card 59. More specifically, these streams of air force end card 59 to the left in FIG. 1 so that all of the other cards are also forced to the left a sufficient distance to maintain that portion of cartridge 10 above channel 52 free of cards. Thus when the card 14 is returned, the second section of cartridge 10 will be able to receive such returning card.

The portion of the rods 17–20 extending across said second section of cartridge 10 have a cross-sectional area so that the top edge of the returning card can index with said rods 17–20. Immediately upon such indexing the air jets through slots 99 will function to push said returning card to the left where it will be suspended on the portions of the rods 17–20 having cross-sectional areas which will prevent the returned card from falling.

In summary, it is to be understood that the rods 17–20 immediately above the chute 52 have a cross-section which can be circular in nature, for example, and which are adapted to receive any returning card regardless of the coding of the slots in the top edge thereof. Said returning card is then moved to the left, by air jets flowing from slots 99, to those portions of the rods 17–20 which have cross-sectional areas calculated to suspend all of the cards until a given card is selected by rotating predetermined rods by predetermined angular amounts.

A second source of air flow is generated within the chamber 77 and results in laminar air flow out of the slot 78 in the direction of the arrow 79. Such laminar air flow functions to keep the cards 11 separated, one from the other, to prevent wear due to the cards rubbing against each other, and also to permit selected cards to fall freely from the cartridge 10 into the chute 12.

For a detailed description of the workable structure for producing the air flows 74 and 78 of FIG. 1 reference is made to U. S. Pat. application, Ser. No. 828,860, filed May 29, 1969 by L. E. Gerlach, entitled CARD PROFILE COMPENSATION FOR REMOVABLE CARD-HANDLING CARTRIDGE, assigned to Sperry Rand Corporation, the common assignee of the present application, and incorporated herein by reference.

Figures 3, 4:
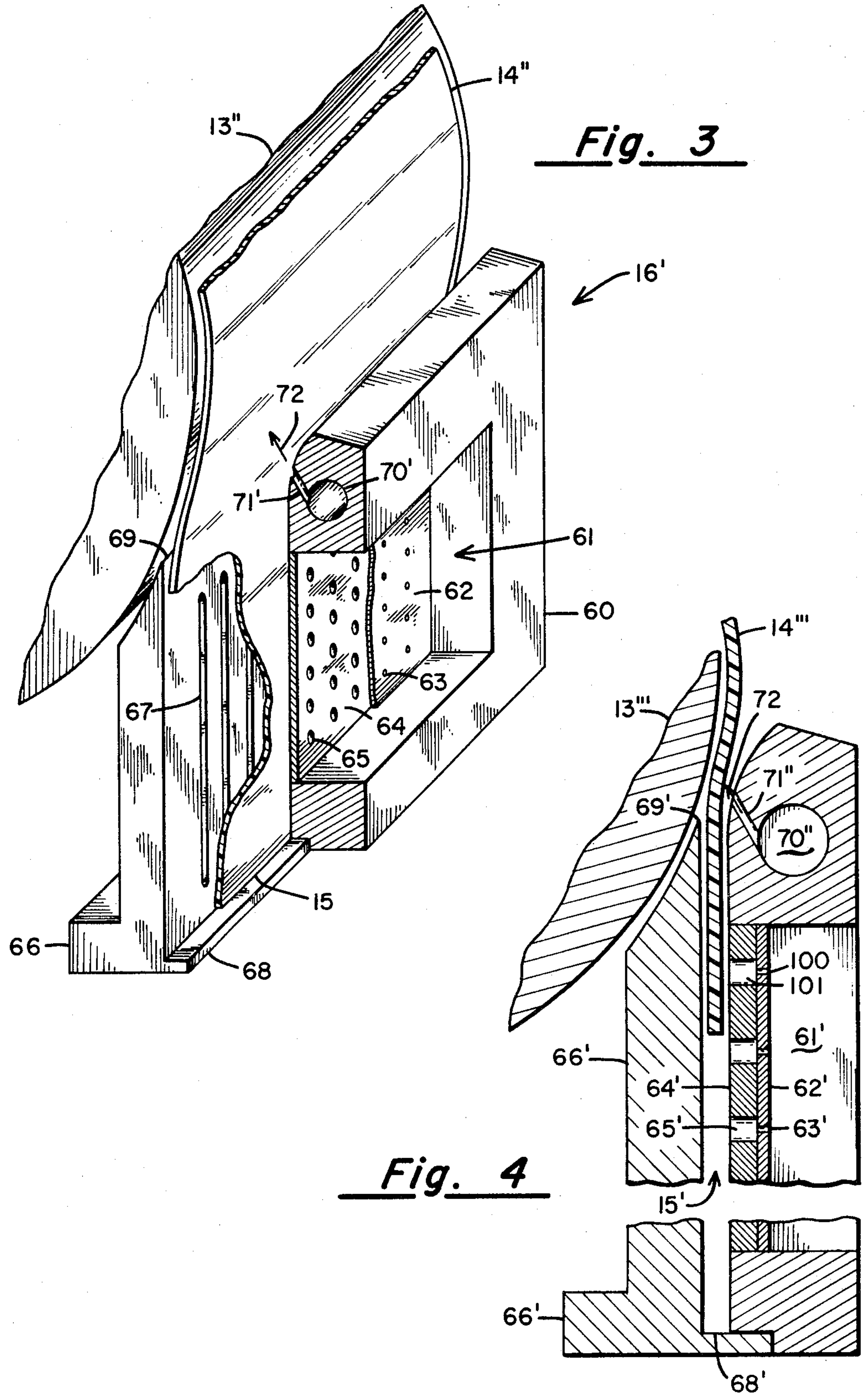
FIG. 3 is a perspective view of one form of braking means which can be employed in the invention.
FIG. 4 is a detailed illustration of the junction of the braking means of FIG. 3 and the periphery of the rotating drum.

Referring now to FIG. 3 there is shown a form of brake 16 which is suitable for use in the present invention. In FIG. 3 the card 14'' is shown as being seated on the bottom plate (stop bar) 68 of the brake shoe element 66. Element 60 which mates with element 66, has a first plate 62 which contains an array of apertures, such as opening 63, formed therein. The element 60 further comprises second plate 64, which also contains an array of apertures, such as apertures 65 formed therein. The second plate 64 is positioned over the first plate 62 such that the two arrays of apertures are coincident. The apertures in plate 64 have a substantially larger diameter than the apertures in plate 62. The purpose of the two plates 62 and 64 having different size apertures will be discussed in more detail in connection with FIG. 4. To aid pick-off of edge 69' in diverting the leading edge of the card 14'' from the drum 13'', a positive air pressure is created in chamber 70' which directs a jet of air through a series of apertures such as 71' in the direction of arrow 72.

A vacuum is created in the recessed chamber 61 of element 60 so that the card 14'' will be drawn to the plate 64 as it enters the slot formed by the plate 64 and the inner surface of the shoe element 66. A series of openings 67 are formed in the shoe 66 to prevent a partial vacuum from being created within the slot 15 before the card 14'' actually enters the slot.

After the card 14'' does enter the slot 15 the openings 67 permit the card 14'' to be pulled over the plate 64. In the absence of the openings 67 the pulling (or pushing) of the card 14'' towards plate 64 would tend to create a reduced air pressure between the card and the inner face of the shoe 67, thereby tending to prevent the movement of the card 14'' over to the surface of plate 64.

Referring to FIG. 4 there is shown the operation of the holes in the plates 64' and 62' as the card 14''' is entering the slot 15'. The diameters of the openings, such as openings 63' and 100 in plate 62' are small enough so that a substantial difference of pressure can be maintained across plate 62' even in the presence of plate 64'.

Thus, shortly after card 14''' passes the first aperture 100 in plate 64' the pressure in said aperture 101 will decrease very rapidly and tend to pull the card 14''' into contact with the surface of plate 64'. As the card 14''' passes more of the apertures in plate 64' the accumulation of forces holding the card 14''' against the surface of plate 64' will exert an increasing braking effect upon the card 14'''. By the time the card 14''' reaches the stop bar 68' it will have slowed down to the velocity where the impact upon stop bar 68' will not damage the card.

The volumetric size of the aperture 101 is sufficiently large so that the leading edge of the card 14''' can pass completely over the aperture 101 before the air pressure therein is substantially reduced. Thus the force pulling the card 14''' towards the plate 64' is somewhat integrated as the card passes into the slot. There are no sudden transient forces created as the card passes each aperture in plate 64'.

It is to be specifically noted that in the absence of the plate 62', which contains the small apertures, the braking effect upon the card would be relatively small since those apertures in plate 64' which were not covered by the card 14''' would pass sufficient air to prevent any substantial reduction in air pressure within chamber 61', i.e., without the aid of a very large vacuum pump. If a sufficiently large vacuum pump were employed, then a vacuum could be drawn in variable vacuum chamber 61' even in the absence of the plate 62' which contains the smaller apertures.

Figure 6:
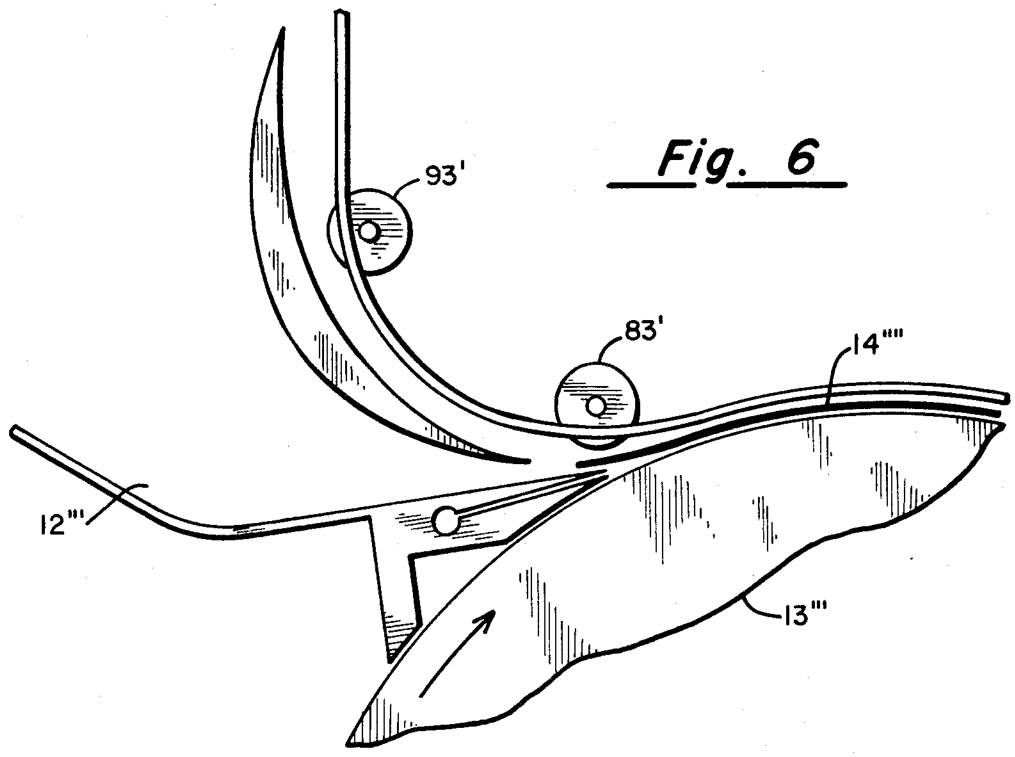
FIG. 6 is another detailed illustration of the junction of the exit of said first chute, the entrance to said second chute, and the periphery of the rotating drum, of the form of the invention shown in FIG. 5.
Figure 5:
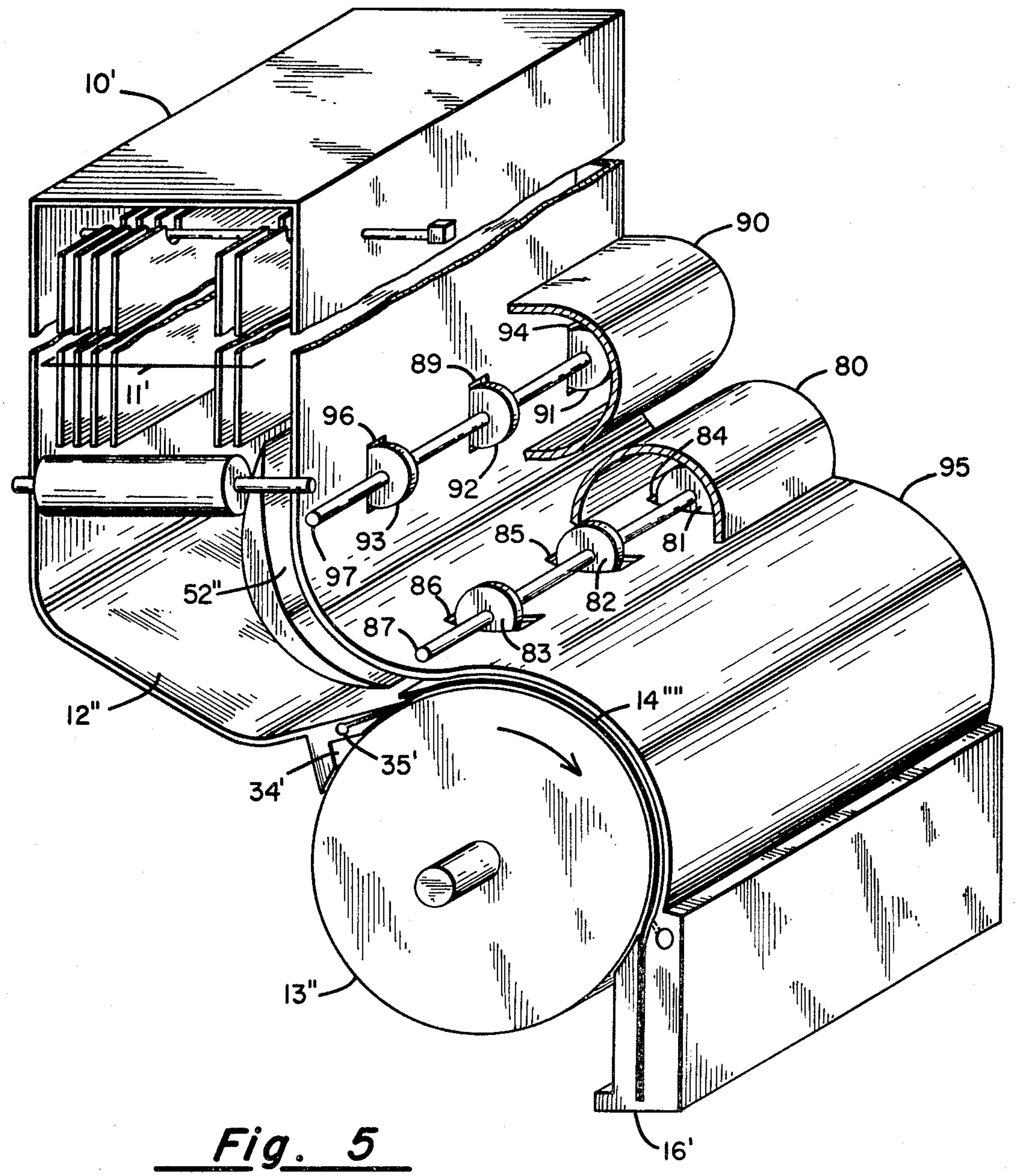
FIG. 5 is a perspective view of an alternative form of the invention.

Referring to FIG. 5 there is shown an alternative form of the invention wherein the rotating capstan 44 of FIG. 1 has been replaced by a rotating capstan disc assembly. More specifically the discs 81, 82 and 83 rotate with shaft 87 which is mounted in suitable bearing means (not shown). Slots 84, 85 and 86 are formed in chute wall 95 which extends continuously from cartridge 10' down to the brake 16'. The rotating disc assembly is enclosed within a cover 80 within which a partial vacuum is drawn. Such partial vacuum results in an air flow through the apertures 84, 85 and 86, which tends to pull the end of the card 14''' from the surface of drum 13'' towards the capstan discs 81, 82 and 83. When the vacuum chamber 34' and the positive air pressure within chamber 35' are released the end of the card 14'''' will be pulled into contact with the capstan discs 81–83 which will initiate the transport of card 14'''' back up into the cartridge 10' in much the same manner discussed in connection with FIG. 1. Reference is made to FIG. 6, which shows in greater detail the relation between the capstan discs, such as disc 83' and the card 14'''' when said card 14'''' is in its predetermined circumferential position.

Referring again to FIG. 5 there is shown a second array of capstan discs 91, 92 and 93 which also extend through a series of slots 94, 89 and 96 in the wall 95 of chute 52''. The capstan discs 91–93 function to continue the transportation of the card 14'''' back into the card holder 10' after the capstan discs 81–83 have initiated such transport.

As in the case of the array of discs 81–83, the discs 91–93 are mounted on a shaft 97 which is supported in suitable bearing means (not shown). The three discs 91–93 are enclosed within a cover 90 within which a partial vacuum is drawn to produce an air flow originating in chute 52'' and flowing through the apertures 94, 89 and 96. Such flow of air functions to pull the card 14'''' into contact with capstan discs 91–93.

It is to be understood that the forms of the invention shown and described herein are but preferred embodiments thereof and that various changes may be made in the structure without departing from the spirit or scope of the invention.

What is claimed is:

1. A random access file comprising:

a read/write station comprising a constantly rotating magnetic head drum;

a plurality of flexible elongated magnetic cards each having first and second end edges;

card holding means comprising first and second sections and constructed to hold said cards therein until released;

transporting means comprising a first chute having first defining walls and a permanent fixed position relative to said card holding means, and constructed to transport any selected one of said plurality of cards, first end edge first, from said first section of said card holding means to a predetermined circumferential position around said drum;

selecting means for releasing a selected one of said plurality of magnetic cards for transportation to said predetermined circumferential position around said drum;

said predetermined circumferential position being fixed with respect to said card holding means;

said read/write station constructed to read from or write upon said selected card when said selected card is in its predetermined circumferential position;

said transporting means further comprising a second chute having second defining walls and constructed to transport the selected card from said predetermined circumferential position back to said second section of said card holding means;

said card holding means being further constructed to remove from said second section all cards other than the card being returned thereto from said predetermined circumferential position around said drum.

2. A random access file in accordance with claim 1 in which:

said second chute comprises at least one opening in the defining walls thereof, which opening is positioned over said second end edge of said card when said card is in its predetermined circumferential position around said drum;

said transporting means further comprises a rotating capstan positioned adjacent said second chute with a portion of the rotating periphery thereof being exposed to the inner portion of said second chute means through said opening therein;

means for creating a partial vacuum outside said second chute and near the said opening therein to produce a flow of air from within said second chute and out said opening therein toward said rotating capstan.

3. A random access memory file as in claim 1 and further including:

air pressure reducing means positioned adjacent the path of the periphery of said rotating drum to reduce the air pressure along that portion of the peripheral path of the drum coincident with the path of said card during transportation thereof to said predetermined circumferential position around said drum.

4. A random access file in accordance with claim 2 in which:

said rotating capstan includes openings formed in the peripheral surface thereof;

and in which said means for creating a partial vacuum outside said second chute includes means for reducing the air pressure within that portion of said capstan passing by said opening in said second chute.

5. A random access memory file in accordance with claim 1 further including:

braking means positioned adjacent the periphery of said rotating drum and including a slot for receiving said card as it is transported to said predetermined circumferential position, and for determining said predetermined circumferential position;

said braking means further including means for picking off the card from the peripheral surface of the drum as said card is being transported to its predetermined circumferential position.

6. A random access memory file in accordance with claim 1 in which:

said defining wall of said first chute includes a terminating edge positioned parallel to the rotational axis of said rotating drum and adjacent the periphery of said rotating drum;

and means for emitting a stream of air from said terminating edge to provide an air bearing for said card as it is transported from said first chute to its predetermined circumferential position around said rotating drum.

7. A random access memory file in accordance with claim 1 and further including:

air pressure reducing means positioned adjacent the path of the periphery of said rotating drum to reduce the air pressure along that portion of the peripheral path of the drum coincident with the path of said card during transportation thereof to said predetermined circumferential position around said drum.

* * * * *